United States Patent [19]

Krafcik et al.

[11] Patent Number: 4,679,896
[45] Date of Patent: Jul. 14, 1987

[54] OPTICAL FIBER SPLICE ORGANIZER

[75] Inventors: Joseph T. Krafcik, Seven Hills; Richard J. Barnes, Mentor; Erwin H. Goetter, Chesterland, all of Ohio

[73] Assignee: Preformed Line Products Company, Cleveland, Ohio

[21] Appl. No.: 781,108

[22] Filed: Sep. 27, 1985

[51] Int. Cl.[4] .............................................. G02B 6/36
[52] U.S. Cl. ................................................. 350/96.20
[58] Field of Search ............... 350/96.15, 96.20, 96.21, 350/96.22

[56] References Cited

U.S. PATENT DOCUMENTS

| | | | |
|---|---|---|---|
| 4,092,019 | 5/1978 | Young | 269/296 |
| 4,266,853 | 5/1981 | Hutchins et al. | 350/96.20 |
| 4,319,951 | 3/1982 | Korbelak et al. | 156/502 |
| 4,332,435 | 6/1982 | Post | 350/96.20 |
| 4,359,262 | 11/1982 | Dolan | 350/96.20 |
| 4,418,982 | 12/1983 | Williams | 350/96.20 |
| 4,428,645 | 1/1984 | Korbelak et al. | 350/96.20 |
| 4,500,166 | 2/1985 | Kunze | 350/96.20 |
| 4,619,499 | 10/1986 | Gerber | 350/96.20 |

FOREIGN PATENT DOCUMENTS

| | | |
|---|---|---|
| 1108904 | 9/1981 | Canada . |
| 0043570 | 1/1982 | European Pat. Off. . |
| 3248003 | 6/1984 | Fed. Rep. of Germany ... 350/96.20 |
| 57-109912 | 7/1982 | Japan . |
| 59-74517 | 4/1984 | Japan .............................. 350/96.20 |
| 59-74523 | 4/1984 | Japan .............................. 350/96.20 |
| WO82/02254 | 7/1982 | PCT Int'l Appl. ............. 350/96.20 |
| 2113865 | 8/1983 | United Kingdom ............. 350/96.20 |

*Primary Examiner*—John Lee
*Attorney, Agent, or Firm*—Fay, Sharpe, Beall, Fagan, Minnich & McKee

[57] ABSTRACT

A tray assembly for organizing optical fiber splices comprising an upwardly open, generally channel shaped main frame having a bottom wall and upwardly extending side walls. A plurality of individual splice trays are removably carried in the main frame in vertically spaced, juxtaposed relationship on threaded studs which extend vertically upwardly from the bottom wall through openings in the trays. The trays are maintained in a predetermined vertically spaced relationship by bosses formed on the base of the main frame and about the openings in the trays. A cover member overlies the trays and extends between the side walls of the main frame.

8 Claims, 9 Drawing Figures

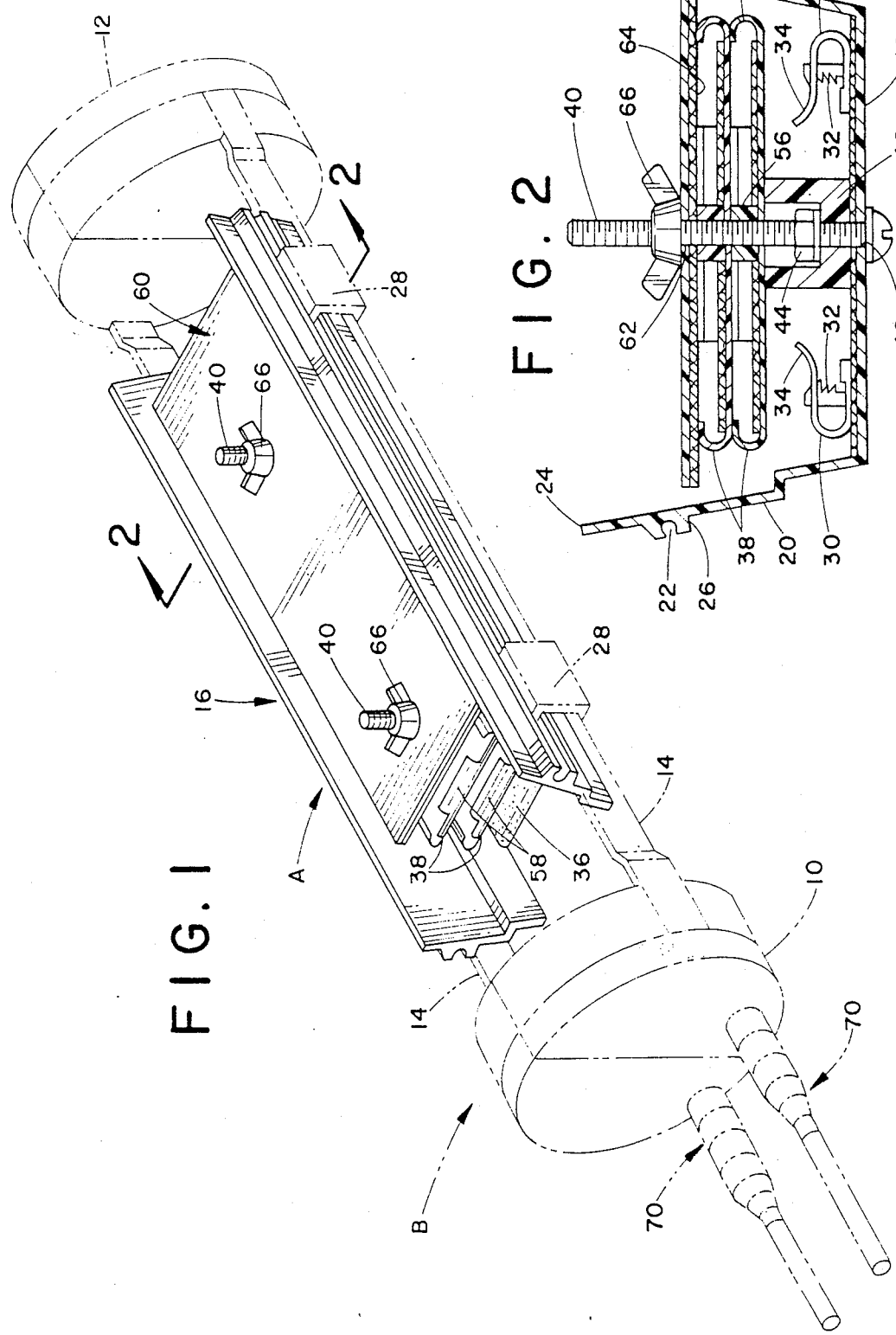

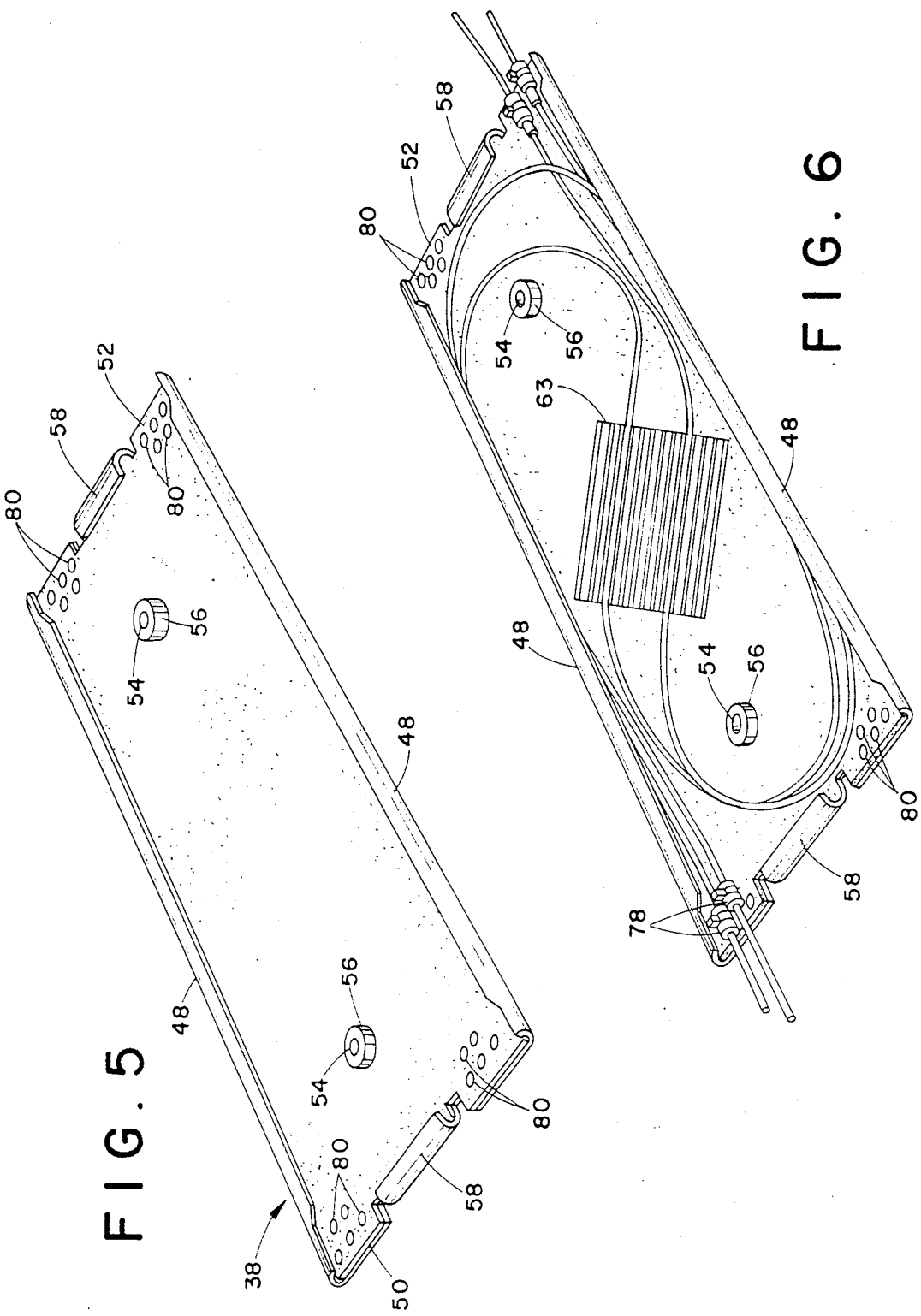

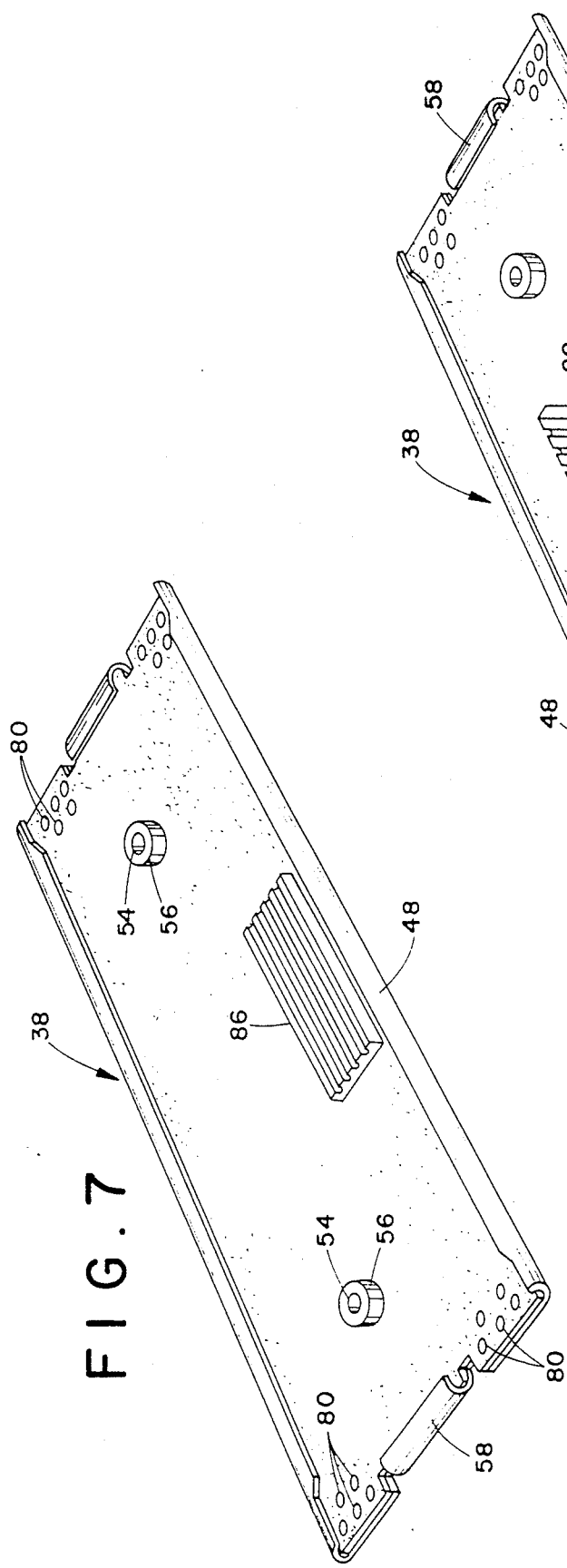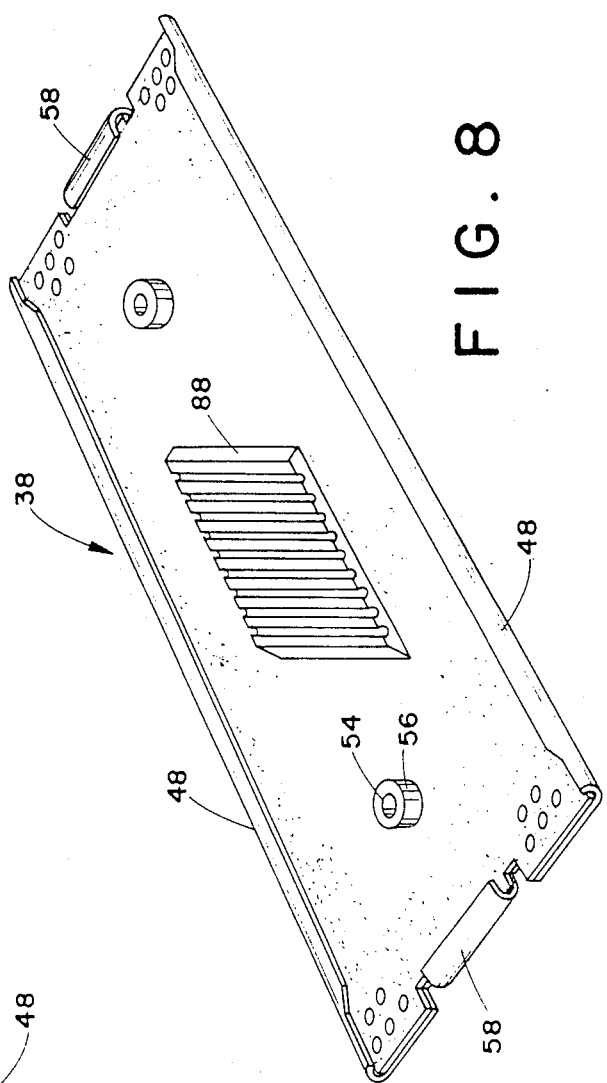

OPTICAL FIBER SPLICE ORGANIZER

FIELD OF THE INVENTION

The subject invention is generally directed to the optical fiber art and, more particularly, to an apparatus particularly suited for organizing and storing optical fiber splices and surplus fiber.

BACKGROUND OF THE INVENTION

Due to the small size and relative fragility of optical fibers, they must be handled and stored with special care. The handling and storage problems are particularly acute in multi-fiber cables where individual fibers must be spliced to allow repairs and rearrangements to be made. In addition, fiber slack must normally be provided adjacent the splices and the need to store the slack further complicates the problems.

Many different optical fiber splice organizers and splice cases have been proposed in the prior art. These prior art organizers have suffered from a variety of defects and drawbacks. Typically, they have been somewhat complex and difficult to use. Generally, many of the prior splice organizers have tended to place undue stress concentration on the fibers resulting in fiber damage. In addition, these prior devices have often failed to provide simple to use, positive means for positioning buffer tubes or allowing buffer tube tie down to be accomplished without using special tools.

Accordingly, there has been a distinct need for a simple, inexpensive and easy to use splice organizer assembly.

BRIEF DESCRIPTION OF THE INVENTION

In accordance with the subject invention there is provided a fiber optic splice organizer and tray assembly which can be used with a variety of standard splice cases. The assembly generally comprises an elongated, generally channel shaped main frame having a bottom wall and upwardly extending side walls. The main frame is formed from a dielectric material, such as a suitable plastic, and has centrally located support members extending vertically upwardly from the base of the main frame. The support members provide means for releasably supporting one or more splice trays in vertically aligned, juxtaposed position relative to the bottom wall of the main frame. The trays preferably comprise generally rectangular bases or support surfaces having inwardly curved flanges along their longitudinal side edges. The trays include openings adapted to be received on the vertically extending support members for maintaining the trays centrally located relative to the side walls of the main frame. Spacer members are formed on the bottom wall of the main frame and each tray so that the juxtaposed trays are maintained in predetermined vertically spaced relationship on the support members.

In accordance with a more limited aspect of the invention the vertically extending support members comprise threaded studs which freely pass through openings formed in the trays. Means are provided for releasably maintaining the trays on the vertical support members. In addition, a cover member is preferably provided to extend over the juxtaposed trays and between the side walls of the main frame.

In accordance with a further aspect of the invention the bottom wall of the main frame and each of the trays are provided with means for permitting the fiber optic cables and/or buffer tubes to be firmly attached to the base of the main frame and/or the individual trays.

OBJECTS OF THE INVENTION

Accordingly, the primary object of the subject invention is to provide a fiber optic splice organizer and tray assembly which is simple in design but provides extremely good protection to the optical fibers.

A still further object is the provision of an apparatus of the type described which is simple to use and is adaptable to a variety of commercially available splice cases.

Yet another object is the provision of a splice organizer assembly of the type described which assures positive buffer tube tie down and prevents damage to spliced or stored fiber in a storage area.

A still further object is the provision of a fiber optic splice organizer assembly which can be used without the need for special tools or assembly techniques.

The above and other objects and advantages will become apparent from the following description when read in conjunction with the accompanying drawings wherein:

FIG. 1 is a pictorial view showing a splice tray assembly formed in accordance with the subject invention mounted in a standard splice case;

FIG. 2 is a cross-sectional view through the splice tray assembly of FIG. 1, the view is taken on line 2—2 of FIG. 1, but shows the assembly removed from the splice case;

FIG. 5 is a pictorial view of one of the individual trays;

FIGS. 6–8 are views similar to FIG. 5 but showing modified forms of trays; and

Figure 9:
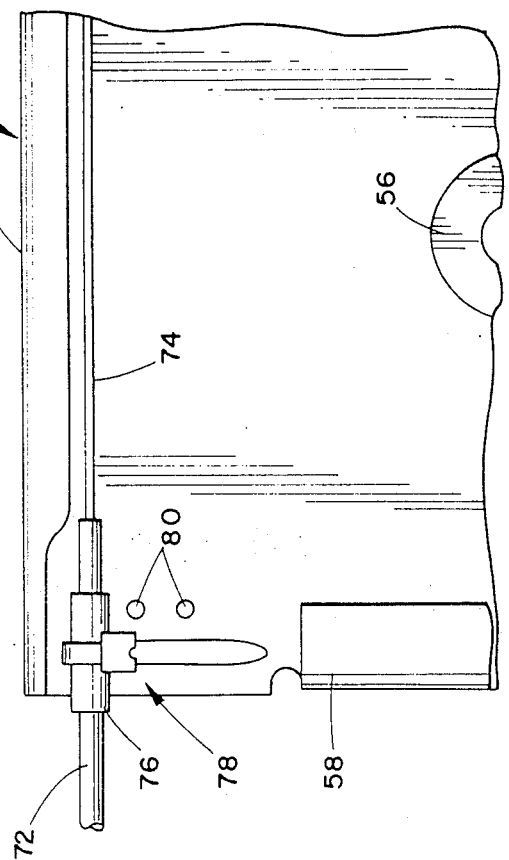
FIG. 9 is an enlarged plan view of a corner portion of one of the trays showing the manner in which the buffer tubes are secured to the trays.

Referring more particularly to the drawings wherein the showings are for the purpose of illustrating a preferred embodiment of the invention only, and not for the purpose of limiting same, FIG. 1 shows the overall arrangement of a fiber optic splice organizer and tray assembly A mounted in a conventional splice case B. Splice case B is only partially illustrated in phantom lines since its details form no part of the subject invention. It has been shown merely to illustrate one preferred method or environment using the fiber optic splice organizer and tray assembly A. As is conventional and well known, the splice case B includes end wall or bulkhead members 10 and 12 interconnected in axially spaced relationship by a pair of tie rods or torque bars 14. The end members 10 and 12 are formed as separate semi-cylindrical members interconnected in any suitable manner such as through used of transversely extending bolts or clamp rings not shown. The end members 10 and 12 are provided with suitable entry ports to accept a fiber optic cable therein. Also, the members 10 and 12 are adapted to receive a circumferential housing (not shown) which encloses the cylindrical space between the end members 10 and 12 to protect the cables and splices therein.

Of importance to the subject invention is the splice organizer and tray assembly A. As shown, the assembly A generally comprises an elongated, generally channel shaped main frame or housing 16. In the embodiment under consideration, the housing 16 is formed from a dielectric material such as a suitable plastic and includes a generally flat bottom wall or base 18 and a pair of upwardly extending side walls 20 which join the lateral side edges of bottom wall 18. As shown, side walls 20 each have a longitudinally extending groove 22 formed generally parallel to and downwardly spaced from top edge 24 of the respective side walls 20. A shoulder 26 extends inwardly beneath each groove 22.

Figure 3:
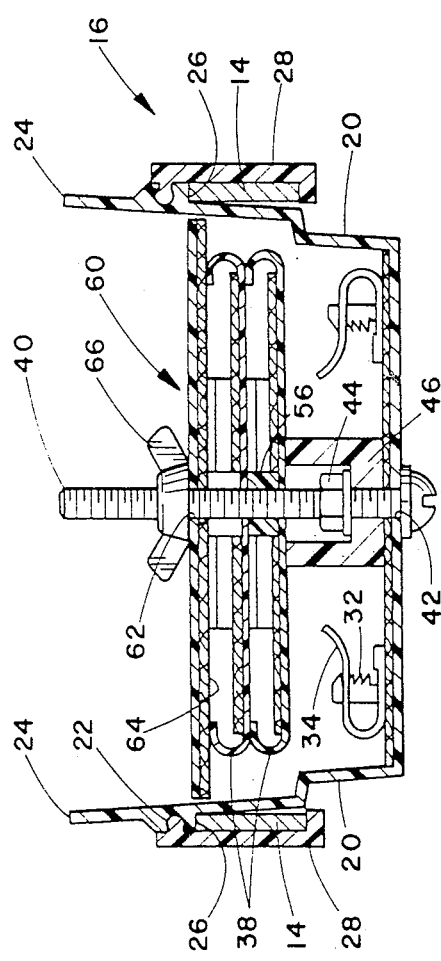
FIG. 3 is a view similar to FIG. 2 but showing the assembly mounted in the splice case.

In the embodiment under consideration, the main frame 16 is sized so as to be closely received between the torque bars 14 of the splice case B. Referring again to FIG. 2, it will be noted that the walls 20 normally flare or diverge outwardly. The amount of divergence is such that when the main frame 16 is placed between the tie rods or torque bars 14 as shown in FIG. 3, the walls 20 must be inwardly deflected from the showing of FIG. 2. Thus, an outwardly directed biasing force acts to hold the main frame relatively firmly between the bars 14. When in position, the upper edge of bars 14 are engaged with the shoulders 26. In addition, clips 28 are provided to extend from groove 22 downwardly about the bars 14. This holds the main frame 16 in position and prevents removal until the clips 28 have been slid longitudinally out of the grooves 22.

Figure 4:
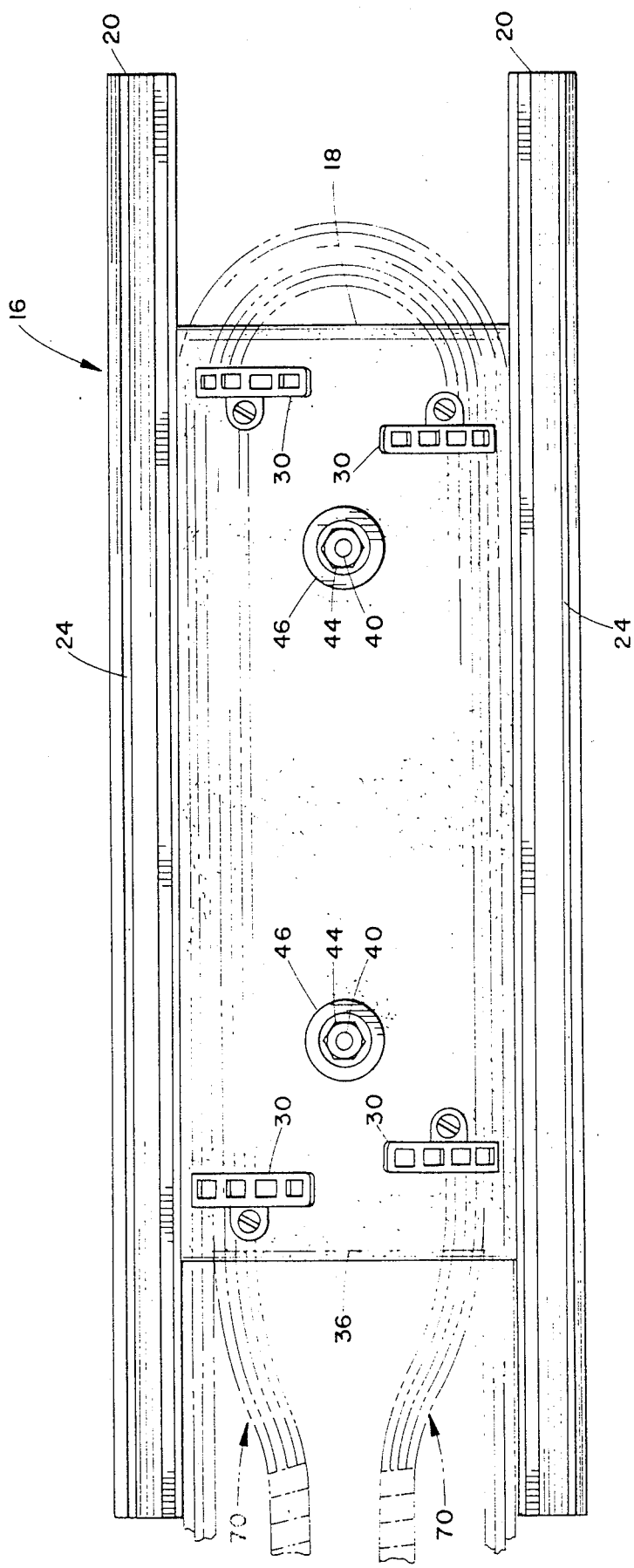
FIG. 4 is a plan view of the main frame member of the splice tray assembly of FIG. 1 with the individual trays removed to more clearly show the construction.

As best shown in FIG. 4, the bottom wall 18 terminates short of the ends of the side walls 20. This provides access to the interior of the assembly from the underside and facilitates use of the assembly and access to buffer tubes and optical cables entering through the end members 10 and 12.

Positioned adjacent each end of the frame 16 are a plurality of cable clips or ties 30. Although the clips are shown connected to the bottom wall 18 they could, of course, be connected to the side walls 20. Clips or ties 30 allow the incoming buffer tubes to be suitably looped and secured to the bottom wall 18 of the main frame. Many different types of clips could be used and, in some instances, Velcro tape or suitably pressure sensitive tape can be used. In the subject embodiment, the clips 30 are conventional molded plastic clips suitably screwed or otherwise connected to the bottom wall. As shown, each clip includes upwardly extending toothed or serrated portion 32 adapted to be received in any of one several corresponding shaped openings in a loop portion 34. This allows the loop to be selectively tightened about a bundle of buffer tubes.

In the embodiment under consideration, the upwardly facing surface of bottom wall 18 is preferably covered with a soft cushioning material such as layer of felt 36. The felt 36 is a commercially available felt material having a pressure sensitive adhesive on the back so that it may be firmly attached to the bottom wall 18. In addition, the felt preferably has a blue color so that the white optical fibers are more readily visible to facilitate locating and handling.

Extending vertically upwardly from generally the center axis of the bottom wall 18 are means for holding and supporting a plurality of superposed trays 38. In the subject embodiment the holding and support means comprise vertically extending threaded members 40 which are shown as bolts or studs passing through openings 42 formed in the bottom wall 18. The bolts are firmly held in position by suitable nuts 44. Positioned between each nut 44 and the bottom wall 18 is a generaly cylindrical molded plastic spacer member 46. The spacer members 46 serve to hold the lowermost tray 38 at a suitable elevation above, and parallel to, the bottom wall 18 such that it does not blind against or interfere with the buffer tubes or optical cables carried on the bottom wall 18.

The trays 38 are best shown in FIG. 5. As illustrated, each of the trays 38 preferably has a generally flat, rectangular configuration. Although many different materials could be used for forming trays 38, in the illustrated embodiment they are formed from plastic. Extending longitudinally of the tray 38 along opposite side edges are reversely curved flange portions 48. A similar flange portion 58 is formed along each end of tray 38. Flange portions 48, 58 stiffen the tray and retain the optical fibers in a manner subsequently to be described. As best shown in FIGS. 2 and 5 flange portions 48, 58 are smoothly rounded and extend back over the top surface of the tray 38. The top face 50 of each tray 38 is also preferably covered with a cushioning layer of felt 52. The cushioning felt is of the type previously discussed and is firmly adhered to the bottom of the tray.

The trays are arranged to be mounted on the threaded members 40 in a generally central location relative to the side walls of the main frame 16. For this reason, suitable openings 54 and formed through each tray 38. The openings 54 are sized and located to correspond to the size and location of the previously mentioned studs 40.

Associated with each opening 54 and extending upwardly thereabout are cylindrical spacer members or bosses 56. Spacer members 56 have a height, which, as shown in FIGS. 2 and 3, generally corresponds to the height of the associated flange portions 48. The arrangement of the spacer members 56 in conjunction with the side and end flange portions 48, 58, allows the trays 38 to be stacked while maintaining suitable spacing and preventing the bottom of a superjacent tray from engaging or being clamped against the optical fibers in a subjacent tray.

As is apparent from FIGS. 1-3, the arrangement thus far described allows a plurality of the trays 38 to be positioned in stacked, juxtaposed relationship on the studs 40. The number of trays 38 used for any particular installation can be varied as required. The limiting factor is, of course, the total height of the threaded stud 40 and the total thickness of the individual trays 38.

In order to maintain the stacked, juxtaposed trays in position on studs 40, and to protect the optical fibers in the topmost tray 38, there is provided a cover 60 which is removably received on studs 40. As shown in FIGS. 1-3, the cover 60 has a length which is preferably at least as long as the associated trays 38. The width of cover 60 is preferably substantially equal to the spacing between side walls 20 of the channel shaped frame 16. Suitable openings 62 are formed through the cover 60 at locations corresponding to the locations of studs 40. In the embodiment under consideration the cover is preferably formed from plastic or other suitable dielectric material. The lower surface of cover 60 is also desirably covered with a cushioning material 64 such as the previously discussed felt material used in the bottom of the main frame in each of the trays. The cover is releasably maintained in position on studs 40 in any suitable manner such as through the use of standard wing nuts 66. The arrangement thus far described allows any desired number of trays to be positioned on the studs 40 and the cover 60 applied thereover. The trays are maintained in suitably spaced juxtaposed relationship and firmly clamped in position by application of the wing nuts 66.

In using the splice organizer and tray assembly as thus far described, the generally channel shaped main frame 16 is firmly positioned on the tie bars 14 of the associated splice case B in the manner previously discussed. Thereafter, incoming groups of buffer tubes 70 are suitably positioned on the bottom wall 18 and looped about the studs 40 as generally shown in dotted lines in FIG. 4. Groups of buffer tubes 70 are suitably secured to the bottom 18 by the previously discussed clips 30. Alternatively, in some installations Velcro or pressure sensitive tape can be used. The free ends of the groups of looped buffer tubes extend a substantial distance out of the main frame (to the left as viewed in FIG. 1, for example). Thereafter, a first splice tray 38 is put in position on the upwardly extending studs 40. The individual buffer tubes containing the optical fibers to be spliced are then brought into position above the first tray. A length of the end portion of the buffer tube is removed so that there is a sufficient amount of optical fiber for splicing and tray placement.

Where each buffer tube enters the splice tray it is preferably firmly connected to the tray in a manner to prevent pullout or disturbance of the fiber on the tray. FIG. 9 shows the preferred method for making these connections. As shown, the individual buffer tube 72 is removed from an associated optical fiber 74 to a point closely adjacent the edge of the tray 38. A length of cushioning material 76, such as the previously mentioned felt, is positioned about the end of the buffer tube 72. A conventional cable tie 78 is thereafter inserted through preformed openings 80 in the corner. The cable tie is pulled tightly to thereby lock the buffer tube in position on the tray. The free end and excess slack of optical fiber 74 is suitably coiled in the tray such as shown in FIGS. 6–8. It should be noted that the previously mentioned flange portions 48, 58 engage the optical fibers and prevent them for extending laterally of the tray. It should also be noted that the spacers 56 protect the fibers from inadvertent engagement with the threaded studs 40.

As illustrated in FIG. 6, each tray can hold several individual spliced fibers. Additionally, trays can include suitable splice holding blocks such as block 63. Block 63 is conventional and includes a resilient plastic block having suitable parallel grooves formed in the upper surface thereof sized to closely resiliently receive the individual splices. Additionally, as can be appreciated, the spliced fibers can be brought in from either end of the trays as is most convenient. In the FIG. 6 embodiment, the fibers to be spliced are brought in from opposite ends of the tray. In order to permit a multiple number of fibers to be carried on any tray the corners of the individual trays are provided with a multiplicity of the previously mentioned cable tie receiving openings 80.

FIGS. 7 and 8 illustrate two alternative arrangements for the trays 38. These trays are identical in all particulars except that they are provided with for example, in the FIG. 7 embodiment, a splice box 86 positioned closely adjacent the right hand side edge. The splice block 86 is provided with a multiplicity of grooves running generally parallel to the side edge of the tray. Similarly, in FIG. 8 a splice block 88 is provided generally centrally of the tray with the individual splice receiving grooves running in a generally diagonal direction relative to the tray surface. It should, of course, be understood that many different arrangements could be provided to suit the needs of any particular installation.

The invention has been described in great detail sufficient to enable one of ordinary skill in the art to make and use the same. It is our intention to include all such modifications and alterations as part of our invention insofar as they come within the scope of the appended claims.

Having thus described the invention, it is now claimed:

1. An organizing tray assembly for optical fiber splices comprising:
   (a) an elongated, generally channel shaped open ended main frame member including a longitudinally extending bottom wall and a pair of spaced upwardly extending integral side walls;
   (b) a pair of threaded support members extending vertically upwardly from said bottom wall at longitudinally spaced location generally midway between said side walls;
   (c) a plurality of generally rectangular tray members each including a base having spaced longitudinal edges and defining a support surface having a width less than the distance between said side walls, each base having openings through which said support members extend to maintain said tray members generally midway between said side walls in juxtaposed relationship; and,
   (d) spacer means for maintaining said tray members in a predetermined, vertically spaced relationship on said threaded support members, said spacer means comprising upwardly extending bosses formed on said bases about said openings and flanges extending upwardly and inwardly from said longitudinal edges, the height of said bosses and said flanges being substantially equal.

2. The tray assembly as defined in claim 1 wherein said frame member includes laterally extending support surfaces formed longitudinally of said side walls for permitting said frame member to be supported from a pair of horizontally extending parallel bar members.

3. The assembly as defined in claim 1 including a cover member overlying said tray members and carried on said support members.

4. The assembly as defined in claim 3 wherein said cover member has a width no greater than the spacing between said side walls.

5. The assembly as defined in claim 1 wherein said spacer means include bosses formed on said bottom wall adjacent said support members.

6. The assembly as defined in claim 1 wherein said tray members have a length no greater than the length of said side walls.

7. The assembly as defined in claim 1 wherein said bottom wall is shorter than said side walls.

8. The assembly as defined in claim 1 wherein said side walls diverge outwardly from said bottom wall.

* * * * *